Aug. 26, 1958     S. M. WALDOW     2,848,898
DIRECTIONAL GYRO TURN ERROR MINIMIZING SYSTEM
Filed Dec. 22, 1955
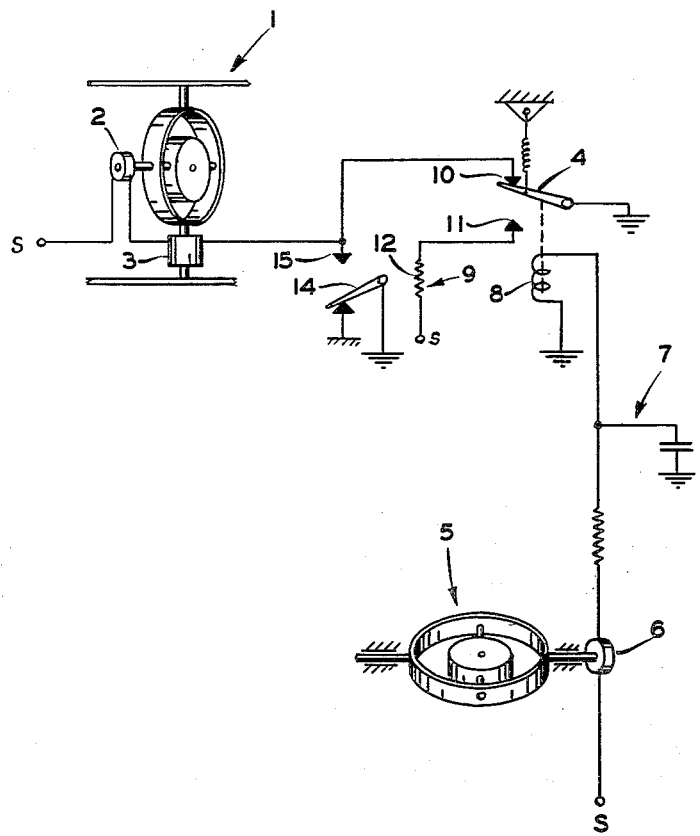
INVENTOR.
SHELDON M. WALDOW
BY
Nicholas J. Garofalo
ATTORNEY

United States Patent Office 2,848,898
Patented Aug. 26, 1958

2,848,898

DIRECTIONAL GYRO TURN ERROR MINIMIZING SYSTEM

Sheldon M. Waldow, Fort Lee, N. J., assignor to Bendix Aviation Corporation, Teterboro, N. J., a corporation of Delaware Application December 22, 1955, Serial No. 554,873

8 Claims. (Cl. 74—5.34)

This invention relates to gyroscopes, and it is particularly concerned with novel improvements therein, the general object of which is to minimize turn error in directional gyroscopes.

It is a well known fact that a pendulous directional gyro, such as is used in aircraft, is subject to heading errors as a result of turning. During such maneuvers, operation of an erection torquer, designed to aid in holding the spin axis of the gyro in its proper direction, tends to increase the error rather than erect the gyroscope.

Cutting out automatic operation of the erection torquer during turn maneuvers, while appearing as a solution to the problem, is likely to cause tumbling of the gyro, further error, as well as possible damage to the gyro, if unduly prolonged.

A further object of this invention is, therefore, to cut out operation of the erection torquer during turn maneuvers for only a short period of time, so as to avoid gyro tumbling and other disadvantages.

Another object of the invention is to avoid cut-out of the erection system during slight turns and yawing actions, such as would not normally effect stability of the gyro.

The invention further lies in its particular structure, as well as in the general organization of its various elements and in their cooperative association with one another to effect the results intended herein.

The foregoing and other objects and advantages of this invention will appear more fully hereinafter from a consideration of the detailed description which follows, taken together with the accompanying drawing wherein an embodiment of the invention is illustrated. It is to be expressly understood, however, that the drawing is for purposes of illustration and description and is not to be construed as defining the limits of the invention.

The drawings schematically illustrates a gyroscope system embodying the invention.

In the drawing, there is shown a conventional pendulous directional gyroscope 1, such as might be used in aircraft. It carries a switch 2, mounted to detect variations of the gyro upon its sensitive axis and serving to effect operation of a conventionally mounted torquer or motor 3 to precess the gyro back to proper position. The torque motor is energized in response to closing of switch 2 by a normally closed circuit through a spring controlled contact 4 to ground.

A turn sensitive rate gyro 5 carries a switch 6 responsive to actions of the gyro during turning actions of the associated craft to establish a circuit from a source S through a short time delay device 7 to energize a relay 8. Energization of the latter opens the normally closed contact 4, and thereby cuts out operation of the torque erection motor 3.

In cases of yawing and slight turns sensed by the rate gyro 5, which would not affect stability of the directional gyro 1, it is not desired that the erection motor be cut out. To this end, the time delay device 7, which is sufficient to delay energization of relay 8 for a short period of time, is provided. The time delay device delays energization of relay 8 for about three seconds, which is considered sufficient time for the craft to recover from slight turns and the like which would not normally affect stability of the directional gyro. If, however, the turn continues beyond three seconds, then relay 8 will be energized and operate to cut out operation of the torquer.

Prolonged disconnection of the erection system is to be avoided, lest tumbling, further error, and possible damage to the gyro occur. For example, aircraft approaching an airfield are sometimes required to circle about before landing for periods of thirty to sixty minutes and longer. Aircraft in search maneuvers circle for extended periods of time. During these prolonged periods of turning, friction created in the bearings, slip rings, and other elements is applied unidirectionally and will rapidly tumble the gyro toward its stops where it will lose all of its stability. Even where tumbling does not take place, prolonged disconnection can introduce large changes in predictable drift effects during and for a long time after completion of the turning.

To avoid prolonged disconnection of the erection system, means, here in the form of a thermal relay 9, is provided to cut the erection system back in after a desired period of time. A circuit to the thermal relay is established by action of relay 8 which, when energized, operates to shift grounded switch arm 4 from contact 10 to the thermal relay contact 11. The heater element 12 of the thermal relay here takes from four to five minutes to heat up sufficiently to close the switch arm 14 from ground to contact 15 to thereby automatically cut the erection motor in again. Accordingly, the erection system is cut out for periods of only four or five minutes at a time. This period of disconnection is desirable as it will eliminate errors in turns of up to five minutes duration. This period will cover most turns of 180° or less. Slow turns in excess of 180° are to be expected only during sustained turning. During these turns, the turn error will, however, be cancelling every 360° with the erection system cut in.

It can now be appreciated, that the system of the present invention will eliminate significant turn errors for practically all turns, and it further prevents tumbling, and possible consequent damage to the gyro. The delay period provided by the thermal relay 9 is predetermined on the basis of the tumbling rate of the gyro 1 and is of such a limited duration as not to permit the gyro 1 to tumble before the gyro erecting motor 3 is rendered operative by the closing of contact 15 by switch 14 of the thermal relay 9.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art; and it is my intent, therefore, to claim the invention not only in the form shown and described, but also in all such forms and modifications thereof as may reasonably be construed to be within the spirit of the invention and the scope of the appended claims.

I claim:

1. In a directional gyro system, means for erecting the gyro to proper position upon the latter varying therefrom, relay means actuated in one sense in response to turning maneuvers of a craft embodying the directional gyro system, means operable by the relay means upon the latter being actuated in said one sense to cut out the erection system, timing means to delay for a predetermined period of time the actuation of said relay means in response to a turning maneuver, and other timing means rendered effective by the actuation of said relay means to connect said erection system back into operation upon the turning maneuver continuing in excess of a predetermined period of time.

2. In a directional gyro system including means for erecting the gyro to proper position upon the latter varying therefrom, relay means actuated in one sense in response to turning maneuvers of a craft embodying the system, means operable by the relay means upon the latter being actuated in said one sense to cut out the erection system, and other means for cutting the erection system back in after a predetermined period of time when the turning maneuver is continuous for a period longer than the last mentioned predetermined period of time.

3. In a directional gyro system including means for erecting the gyro to proper position upon the latter varying therefrom, relay means actuated in one sense in response to turning maneuvers of certain duration of a craft embodying the system, means operable by the relay means upon the latter being actuated in said one sense to cut out the erection system, and timing means simultaneously operable by the relay means with the cutout means to cut the erection system back in after a predetermined period of time when the turning maneuver is continuous for a period longer than the last mentioned predetermined period of time.

4. The combination comprising a pendulous directional gyro, a torque motor energizable in response to oscillations of the gyro to precess it back to its proper position, a rate turn-gyro, circuit means including a relay energizable in response to actions of the rate turn-gyro, a time delay device, and switch means operable by the energized relay to simultaneously cut out the torque motor and to operate the time delay device, and further switch means operable after a predetermined period of time by the time delay device to cut the torque motor back in.

5. In the combination including a pendulous directional gyro, a torque motor energizable in response to variations of the gyro to precess the latter to proper position, and a rate turn-gyro for initiating by its actions a circuit to cut out energization of the torque motor, a relay energizable in response to the action of the rate turn-gyro, an electrical time delay device, switch means simultaneously operable by the relay to cut out energization of the torque motor and to effect energization of the time delay device, and other switch means operable by the time delay device at a predetermined period of time subsequent to energization of the latter to cut the torque motor back in.

6. In the combination as in claim 5, wherein the time delay device is a thermal relay.

7. In the combination as in claim 5, wherein timing means is interposed in the circuit from the rate turn gyro to the relay to delay energization of the latter for a predetermined period.

8. In a cut-out, cut-in electrically driven erection system for a pendulous directional gyro, a relay to cut the erection system out, a thermal relay to cut the erection system back in after a predetermined delay upon a turning maneuver having been continuous for a period exceeding said predetermined delay, and a turn rate gyro controlling the operations of both relays.

References Cited in the file of this patent

UNITED STATES PATENTS

| | | |
|---|---|---|
| 2,561,367 | Haskins | July 24, 1951 |
| 2,678,564 | Douglas et al. | May 18, 1954 |
| 2,699,681 | Johnson | Jan. 18, 1955 |